July 25, 1961  R. D. DURAND ET AL  2,994,074
WEB MOVEMENT INDICATOR
Filed Dec. 30, 1957  6 Sheets-Sheet 3

INVENTORS
ROBERT D. DURAND,
ROBERT G. DRISCOLL
and RICHARD O. COBB
BY Geoffrey Knight
ATTORNEY INVENTORS
ROBERT D. DURAND,
ROBERT G. DRISCOLL
and RICHARD O. COBB
BY Geoffrey Knight
ATTORNEY

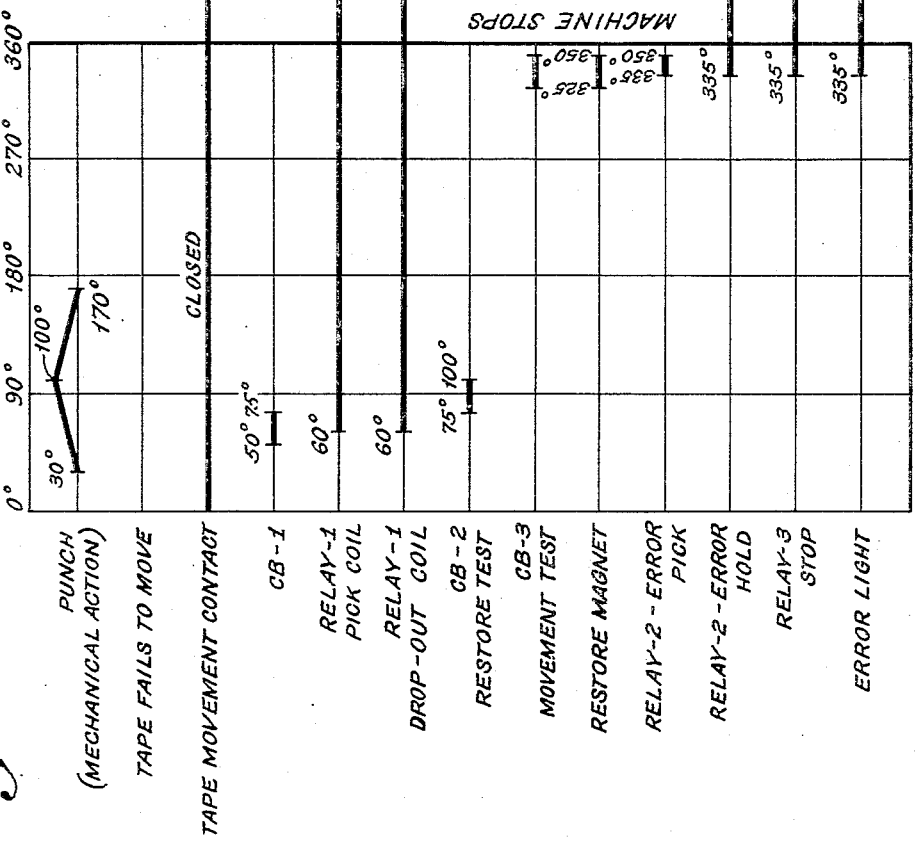

2,994,074
Patented July 25, 1961

1

2,994,074
WEB MOVEMENT INDICATOR
Robert D. Durand, Pleasant Valley, Robert G. Driscoll, Cold Spring, and Richard O. Cobb, Poughkeepsie, N.Y., assignors to International Business Machines Corporation, New York, N.Y., a corporation of New York
Filed Dec. 30, 1957, Ser. No. 706,167
6 Claims. (Cl. 340—259)

This invention relates to web handling devices and more particularly to means for detecting and checking that intermittent movement of the web has been properly accomplished.

Movement of a web through a device subjects it to various strains and occasionally the web breaks or tears. This is especially true if the web is moved intermittently. In addition, the web might jam in the device through which it is passing.

An object of the invention is to provide means for checking that normal movement of the web has occurred.

Another object of the invention is to detect breakage or jamming of a web.

Another object is to provide a web movement indicator which can interlock the apparatus in which it is employed in case of breakage or non-movement of the web so that corrective actions can be taken.

Another object is to provide a device of the kind described, that is simple in construction and operation.

Another object is to provide means for signalling either that the web has moved normally or has not moved at all or both.

Another object of the invention is to provide means for checking web movement which will perform its operation rapidly, thus not limiting the speed of operation of the machine in which it is employed.

Other objects of the invention will be pointed out in the following description and claims and illustrated in the accompanying drawings, which disclose, by way of example, the principle of the invention and the best mode which has been contemplated of applying that principle.

In the drawings:

FIGS. 6 and 7 are additional timing diagrams showing error conditions.

Figure 1:
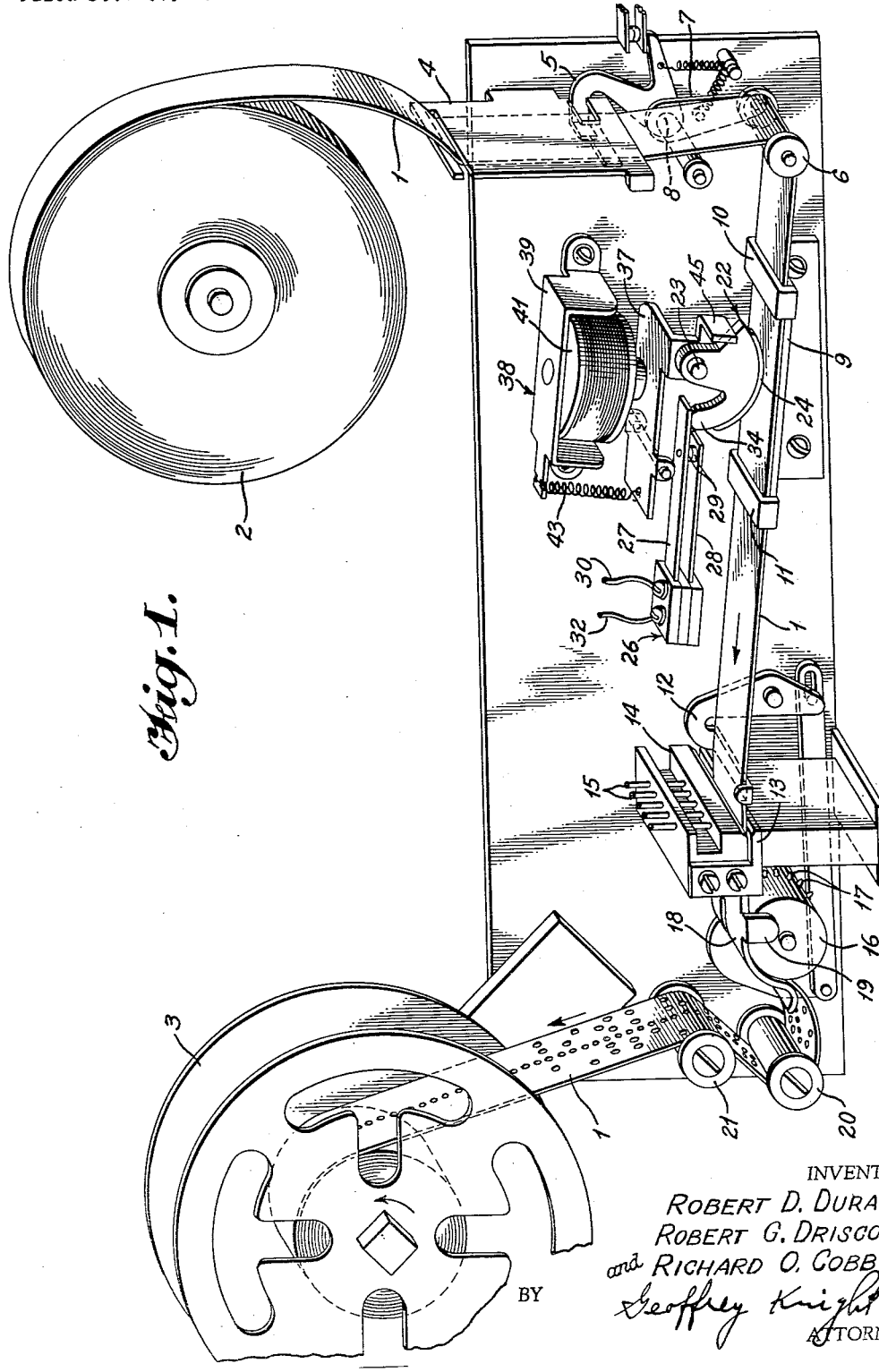
FIG. 1 is a diagrammatic perspective view of the preferred embodiment of the web movement indicator incorporated in a tape record punching mechanism.

Referring to FIG. 1, the invention is shown being used in a tape punching mechanism. The particular mechanism was selected for ease and simplicity in explaining the invention's functions, but it will be apparent that the invention can be incorporated in any mechanism wherein a moving web or tape is utilized, subject only to the imagination of the user. Only those parts of the mechanism are shown which are necessary to understand the functions of the invention.

2

The paper tape 1 which is to be punched originates at supply reel 2 and is fed in a generally right to left direction to take up reel 3. In its passage through the device the tape 1 is routed first through a tape turning guide 4, next past a tape runout contact 5, then around a roller 6 on tape tension arm 7 pivoted at 8. The tape then passes over a tape supporting table 9 and under guides 10 and 11. It is at this point that proper movement of the tape 1 is checked and improper movement is detected by the present invention. The tape 1 continues its passage through the device past a tape guide assembly 12 and between a punch die 13 and a stripper 14 which have associated punches 15. This is where punching of the desired code holes and feed holes is accomplished in the tape 1. Immediately past the punching station is a tape pinwheel 16 which has feed pins 17. The feed pins 17 engage feed holes in the tape which have been punched in the tape 1 at the punching station. The tape 1 is retained on the tape pinwheel 16 by a pinwheel guide 18 and a turned over ear 19. The tape 1 passes between a lower tension guide stud 20 and an upper tension guide stud 21, and is then wound onto take up reel 3.

The various components or parts shown in FIG. 1 could be rearranged and still accomplish their desired functions. For example, the web movement indicator, which will be described in detail shortly, might be placed between the punching station and the tape pinwheel 16 rather than ahead of the punching station as shown.

One way of obtaining the punch and feed operations of the tape punching mechanism shown in FIG. 1 is by utilizing a clutch mechanism such as that described and illustrated in U.S. Patent No. 2,784,785. A clutch of this type will permit one cycle of operation each time its associated clutch magnet is energized. The beginning of each cycle is assumed to be 360° in the description of the machine operation herein.

The necessary circuit breakers and cams can be fixed on the clutch driven shaft so that various operations will be performed at desired times during each cycle of operation.

Figure 2:
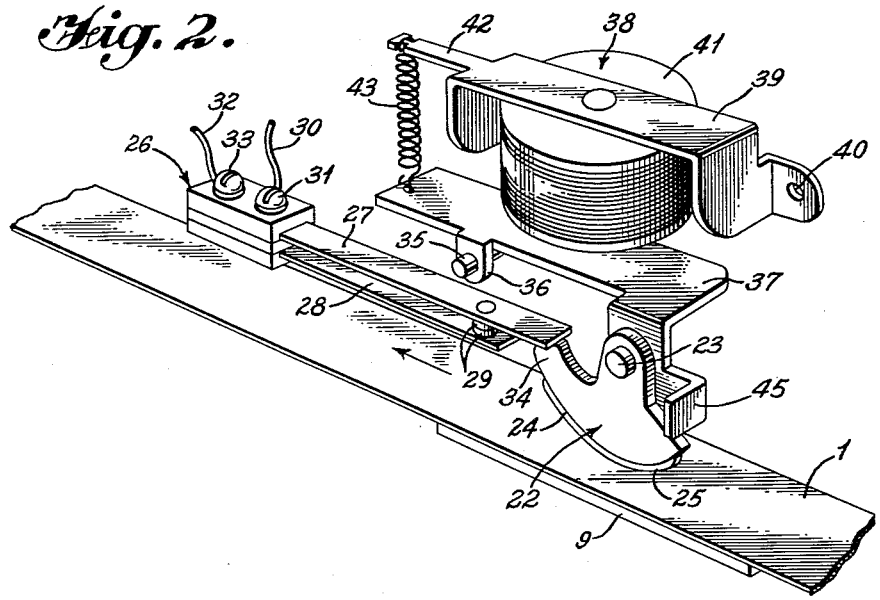
FIG. 2 is a perspective view on a larger scale of the web movement indicator shown in FIG. 1 showing the use of a magnet for restoring the device.

A enlarged view of the invention as incorporated in FIG. 1 is shown in FIG. 2. Certain parts such as guides 10 and 11 are not shown in FIG. 2 for reasons of simplicity. In addition, the tape supporting table 9 need not be in the form shown in FIG. 1 but might simply be a flat plate or bracket over which the tape passes as shown in FIG. 2. Tape movement in FIG. 2 is also from right to left.

Directly above the table 9 and resting on the tape 1 is a shoe assembly 22 which is free to move from right to left and left to right about pivot stud 23. The lower edge of the shoe is formed in an arc 24 and attached along this edge is a friction material 25 which actually rests against the tape.

The friction material 25 should be of some material smooth enough not to cause excess wear on the tape 1 and yet have sufficient frictional characteristics so that as the tape 1 moves to the left the lower edge 24 of the shoe assembly 22 will swing in an arc to the left about the pivot stud 23. Materials satisfying the requirements for this particular application of the invention might be natural or synthetic rubber, while materials satisfying other applications of the invention might be nylon or glass.

The composition of the friction material 25 on the shoe assembly 22 can be selected appropriate to the composition of the web passing through the particular device in question. If the web has a smooth glass-like surface then the friction material 25 can be composed of a substance having a higher coefficient of friction. If the web has rougher characteristics, then satisfactory operation of the invention can be achieved with a friction material 25 having a lower coefficient of friction. The entire shoe assembly 22 might be composed of the frictional material chosen rather than being of two separate materials as shown.

Just to the left of the shoe assembly is a contact assembly 26 having two contact straps 27 and 28 each having a contact point 29, the straps 27 and 28 being so placed that the points 29 are normally in contact with each other. We shall refer to the invention in this particular use as the "tape movement indicator" and to the contact assembly 26 as the "tape movement contact." The tape movement contact is normally in a closed condition in this embodiment of the invention, but could equally well be normally open. Wire 30 is attached by means of screw 31 to strap 27 and wire 32 is attached by means of screw 33 to contact strap 28.

These wires connect the tape movement contact 26 into an error detection circuit which will be described later.

It can be seen in FIG. 2 that contact strap 27 is longer than contact strap 28 and extends to the right over a projection 34 on the shoe assembly 22. It can also be seen that as shoe assembly 22 swings in an arc to the left about pivot stud 23 the projection 34 will press against the underside of strap 27, opening the tape movement contact.

The pivot stud 23 on which the shoe assembly 22 is mounted is affixed to an armature 37 pivotally supported on a stationary shaft 35. Mounted in a fixed position above the armature 37 is a magnet assembly 38 consisting of a bracket 39 having mounting holes 40 therein, an electromagnet 41, an extension 42, to which one end of a spring 43 is fastened, the other end of spring 43 being secured to armature 37. The magnet 41 will be referred to as the restoring magnet. When restoring magnet 41 is energized it will attract armature 37 so that armature 37 will swing up to it, about pivot shaft 35, and since shoe assembly 22 is attached to the armature 37 at pivot stud 23 the shoe assembly 22 will be raised off the tape 1.

Contact strap 27 has an inherent tension toward contact strap 28 and when the shoe assembly 22 is raised off the tape 1, contact strap 27 will press against projection 34 and cause the shoe assembly 22 to swing back to stop 45 which prevents the shoe assembly 22 from swinging beyond a certain point to the right.

When the restoring magnet 41 is de-energized, armature 37 is rocked clockwise by spring 43, bringing the surface of the shoe assembly 22 again in contact with the tape 1.

Figure 3:
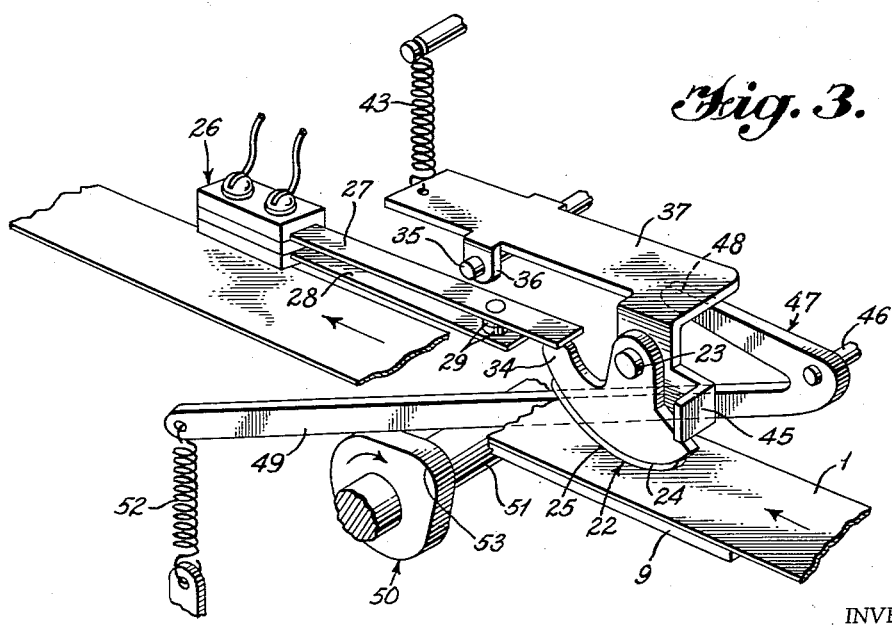
FIG. 3 is also a perspective view on a larger scale of the web movement indicator shown in FIG. 1 showing the use of mechanical means for restoring the device.

Rather than making use of a magnet to raise the shoe assembly 22 and permit it to return to its initial position against the stop 45 and the tape 1, a mechanical type knockoff like that shown in FIG. 3 might be employed to strike the armature 37 thus raising it. The shoe assembly 22 will restore in a manner similar to that previously described.

Tape 1 has been partly cut away in FIG. 3 so that the parts involved in restoring the shoe assembly 22 can be easily seen. Mounted near armature 37 on pivot stud 46 is an armature knockoff cam lever 47. The armature knockoff cam lever 47 has an arm 48 which extends to the left underneath and adjacent to armature 37. Another arm 49 of the armature knockoff cam lever 47 extends to the left and rides on a cam 50. Cam 50 is shown fixed on a shaft 51 which rotates. Shaft 51 may be the same shaft that drives the punches 15 and the feed pinwheel 16 shown in FIG. 1. Arm 49 is retained against cam 50 by spring 52.

A portion of the periphery of cam 50 is raised at 53. As the shaft 51 and cam 50 rotate, the high portion 53 of the cam 50 will press against the underside of arm 49 and raise it at restoration time each tape feed cycle. When arm 49 raises, the armature knockoff cam lever 47 of which it is a part will pivot in a clockwise direction about pivot stud 46 and arm 48 will strike against the underside of armature 37. Armature 37 will pivot about shaft 35, thus raising the shoe assembly 22, permitting it to restore to its initial position. When the armature knockoff cam lever drops off the high portion 53 of the cam 50, the armature 37 will rock clockwise about shaft 35 and bring the shoe assembly 22 again into contact with the tape 1.

Figure 4:
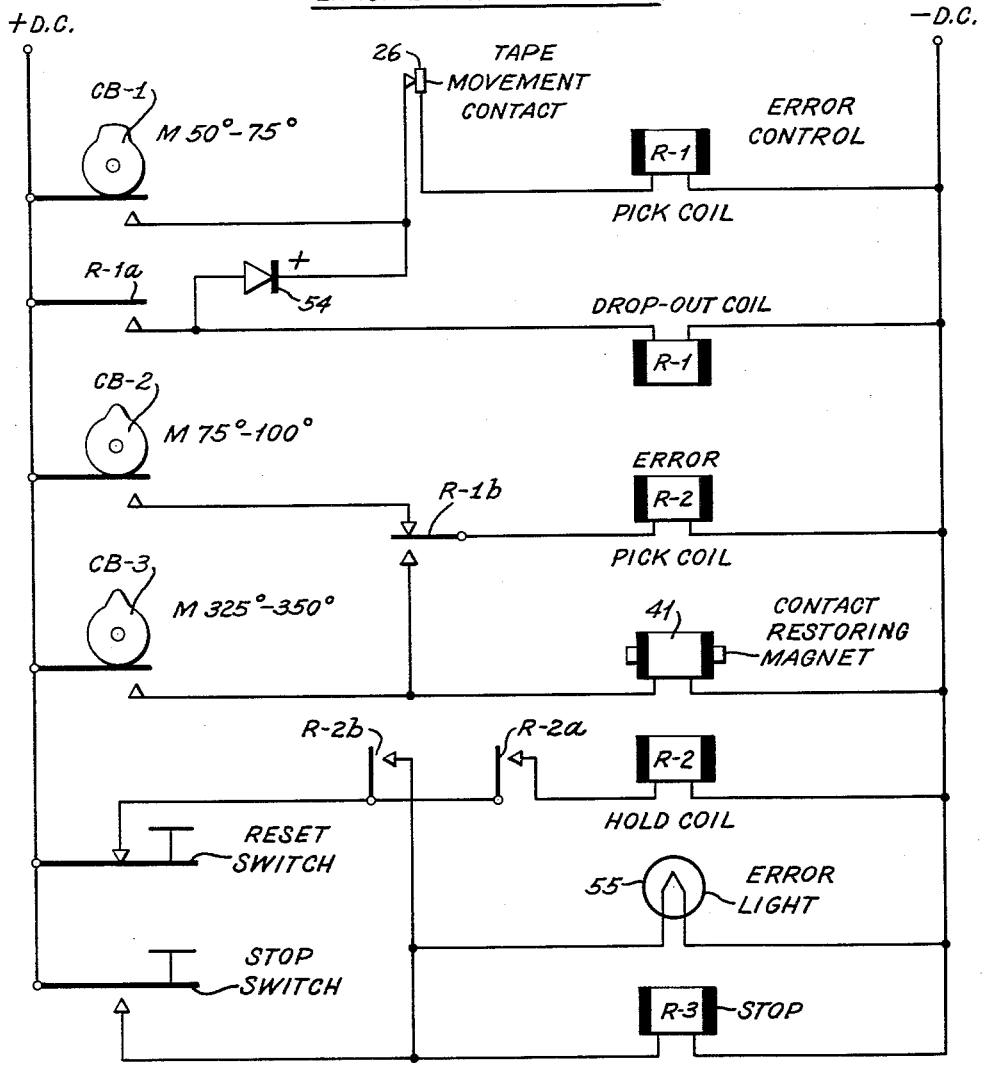
FIG. 4 is a circuit diagram of an error detection circuit utilizing the web movement indicator shown in FIG. 2.

Referring to FIG. 4, the tape movement contact 26 is shown incorporated in an error detection circuit. Various relays and magnets are schematically shown as being operated from a D.C. voltage source when the voltage is made available through circuit breakers shown, through the tape movement contact, or through relay points which open and close.

Circuit breakers CB1, CB2 and CB3 are not illustrated in FIG. 1 but they would normally be opened and closed in some predetermined timed relationship with the operation of the punches 14. Any type of circuit breaker might be used for this purpose such as the rocker type or plunger type which are operated by cams. If the punch driving mechanism includes a rotating shaft, the cams can be placed on the shaft and their positions fixed in a definite relationship with respect to the movement of the punches.

Figure 5:
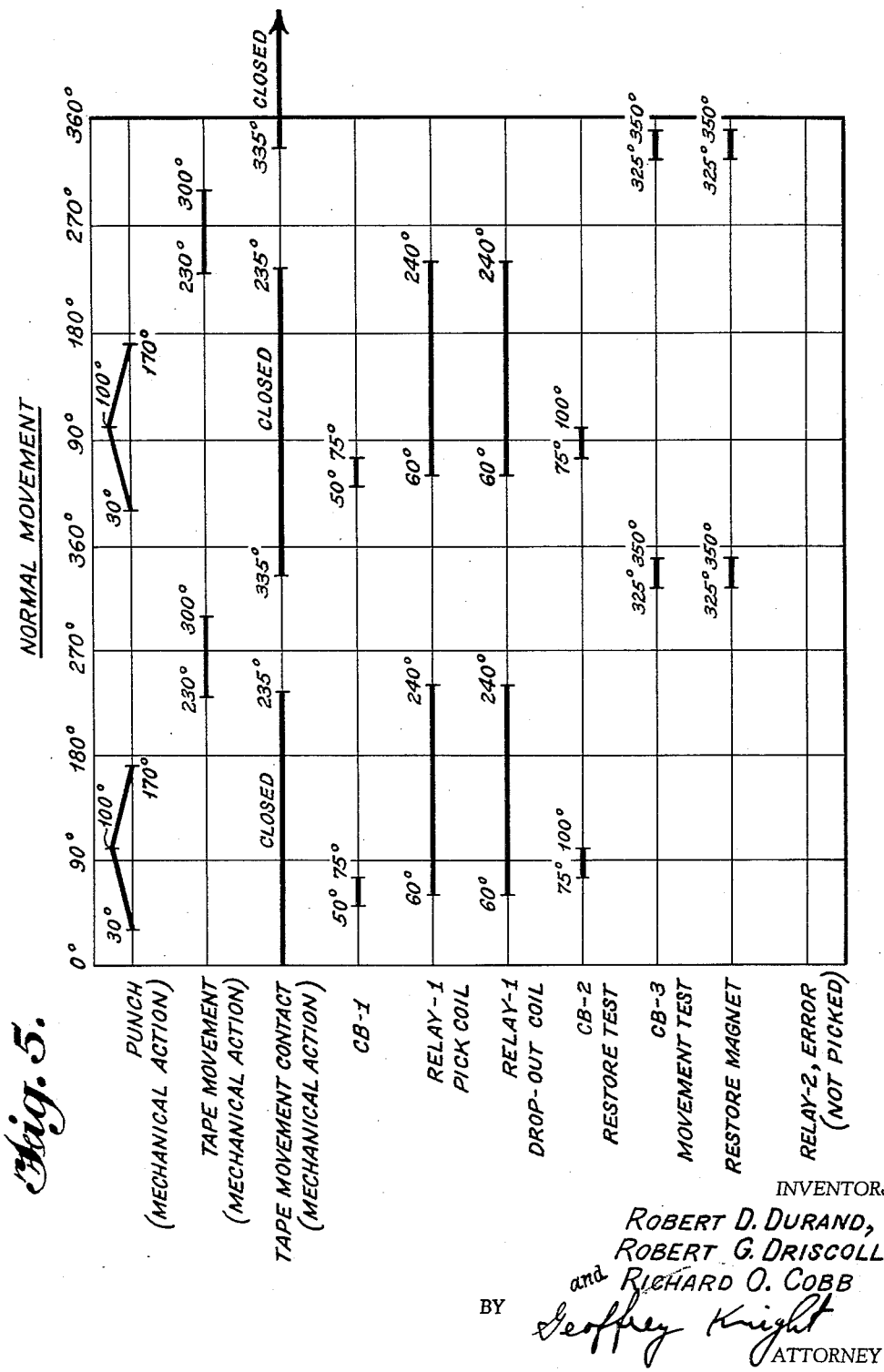
FIG. 5 is a timing diagram of the mechanical and electrical actions of the device shown in FIGS. 1 to 4.
Figure 6:
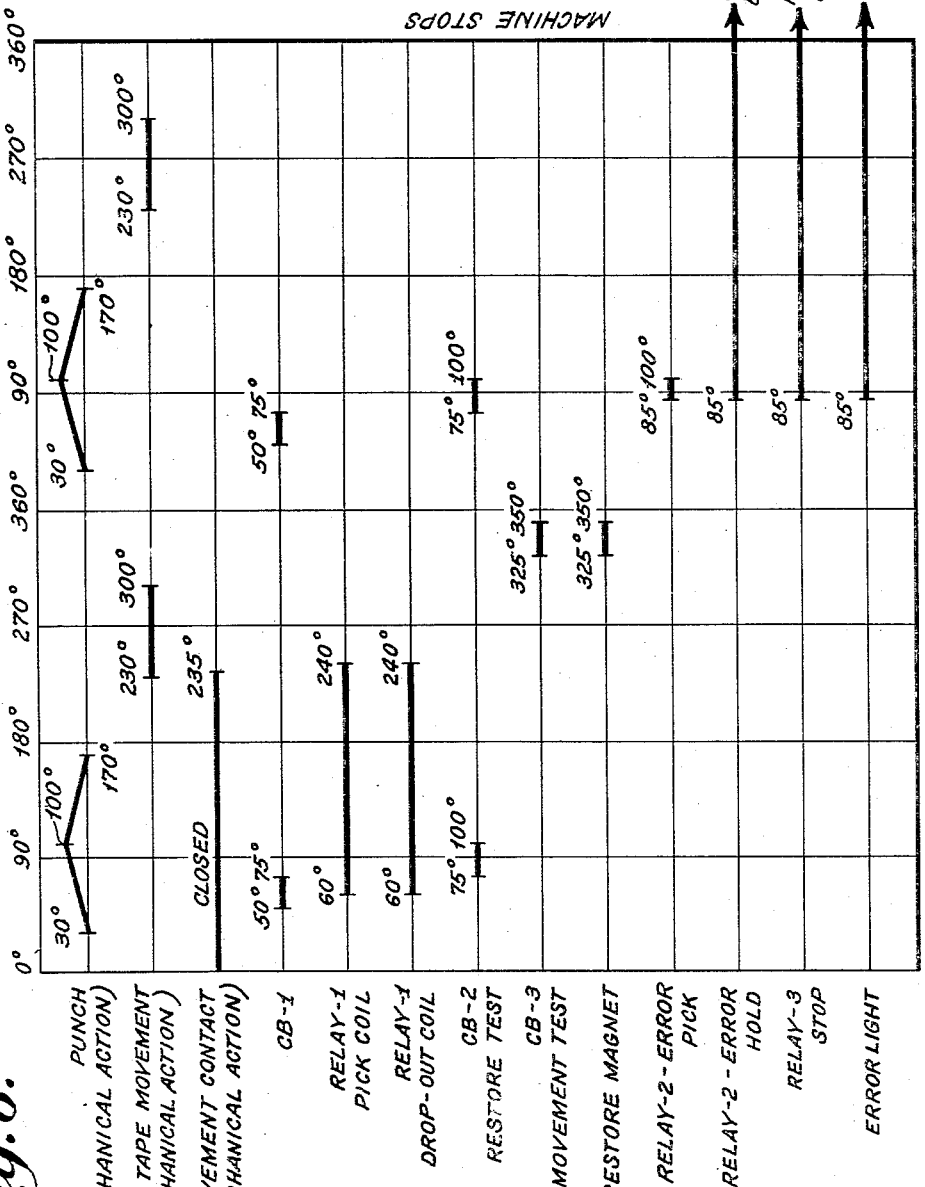

For purposes of illustration, the normal punching cycle is shown in FIG. 5, FIG. 6 and FIG. 7 as starting at 0° and ending at 360°. The times when circuit breakers CB1, CB2, and CB3 are closed within this normal punch cycle are indicated in FIG. 4 next to the particular circuit breaker involved.

The timings shown and the arrangement of components in a detection circuit are suggested to illustrate the use of the invention, and many changes in timings or arrangement of the circuit to accomplish the desired purposes will be apparent to those skilled in the art.

For an understanding of the invention under normal operation, reference is made to FIG. 5. From 0° to 360° is considered to be one punch cycle. Therefore, two punch cycles are shown in FIG. 5. For illustrative purposes, the punching of the tape is shown to occur in the first half of the punch cycle from approximately 30° to 170°. The punches 15 reach their maximum limit of travel into the die 13 at 100° of the cycle. While punching is being accomplished the tape 1 remains stationary. After punching, the tape 1 is moved one position by the rotation of tape pinwheel 16 from 230° to 300° of the punch cycle. As can be seen in FIG. 1, the rotation of tape pinwheel 16 is counterclockwise and this will tend to pull the tape 1 from right to left through the punch station. Under normal conditions the tape now has moved one column to the left and is in position for punching to take place in the following cycle. Because of friction between the tape 1 and the shoe assembly 22 movement of the tape will cause the shoe assembly 22 to swing about its pivot stud 23 and projection 34 on shoe assembly 22 will press against upper contact strap 27 thus opening the tape movement contact 26.

The mechanical action involved can be understood by reference to FIGS. 2 and 3. The electrical action involved can be seen by referring to FIG. 5 where the tape movement contact is shown as being in a closed condition at the beginning of the cycle and opening up shortly after the tape movement has started. There is a slight delay of 5° indicated between the start of the tape movement and the time that the tape movement contact actually opens at 235°.

In its normal or restored position the tape movement contact 26 is closed. Thus in order to determine whether it has restored to its normally closed position, a check is made early in each cycle and if has not been restored, an error will be indicated as will be described shortly. This can be understood by referring to FIG. 4 in conjunction with FIG. 5, and it can be seen that when circuit breaker CB1 makes at 50° to 75° of the punch cycle if the tape movement contact 26 is closed as it should be, then relay R1 will be picked up. Relay R1 will not pick up immediately and as seen in FIG. 5, it is shown as being fully picked up 10° after the circuit breaker CB1 makes. Relay R1 will hold through its own R1a point to the line. This relay is referred to as the error control relay. Referring to FIG. 4 again, it can be seen that if the R1b points are transferred, as they will be when relay R1 picks up, then the impulse from circuit breaker CB2 which is provided at 75° to 100° of the punch cycle cannot pick up relay R2, the error relay. Thus as long as the tape movement contact 26 is closed early in the cycle, as it should be, no error will be indicated for failure of the shoe assembly 22 to restore.

Since a punching mechanism such as this would probably operate at speeds of 1200 revolutions per minute or higher, the duration of one punch cycle may be only 50 milliseconds. It is therefore necessary and desirable that the relays used in the machine and especially in the error detection circuit pick up and drop out rapidly. Relay R1 is a high speed pick up relay and to insure that it drops out rapidly, a drop-out coil is wound opposite on the relay to the pick coil with one-half the number of windings that the pick coil has. As soon as the R1 dropout coil is energized, it will oppose the efforts of the pick coil to hold the relay up but since it has only one-half the magnetic force that the pick coil has, the pick coil will still exert enough force to hold relay R1 up.

As soon as the tape movement contact 26 opens, the pick coil of relay R1 no longer can exert a magnetic force to hold the relay up, and since the R1 dropout coil exerts a force opposite to that of the pick coil, the relay R1 will drop out much more rapidly than it would without the use of a dropout coil. This is illustrated in FIG. 5 where it is shown that it takes 10° of the cycle to pick the relay fully up after the impulse is applied to it and only 5° to drop the relay fully out when the tape movement contact has opened. The 10° pick up and the 5° dropout have been selected arbitrarily for illustrative purposes only and would naturally vary depending on the type of relay that is used, the ratio of the windings of the pick coil on the relay to the dropout coil and the speed of operation of the device in which the invention is employed.

Rectifier 54, shown in FIG. 4, is provided to permit the R1 pick coil to remain energized through the tape movement contact and R1a point to line after CB1 breaks, but to prevent the R1 dropout coil from being energized by CB1 when it makes.

As was mentioned previously, normal movement of the tape will cause shoe assembly 22 to swing about its pivot stud 23 and thus open the tape movement contact 26. This occurs in the last half of the cycle and the tape movement contact is normally open from 235° to 335° of the punch cycle. When the tape movement contact 26 opens at 235°, relay R1 will drop 5° later at 240°. Therefore, relay R1 should not be picked up from there until the end of the cycle.

It is desirable to know whether movement of the tape has been properly accomplished during the last half of the cycle and this is done by using circuit breaker CB3 which makes from 325° to 350°. By referring to FIG. 4, it can be seen that if relay R1 had stayed up because of failure of the tape movement contact 26 to open, then an impulse from circuit breaker CB3 can reach error relay R2 through the R1b points which would be transferred.

Assuming that tape movement has been normal, relay R1 will have dropped out and therefore the impulse from circuit breaker CB3 will not pick error relay R2 and will pick only the restoring magnet 41. In FIG. 2 when the contact restoring magnet 41 has been energized, armature 37 will be pulled to it, thus lifting shoe assembly 22 off of the tape 1 and because of the tension on contact strap 27 exerted on projection 34, the shoe assembly 22 will swing back to the right and be stopped by stop 45. A certain amount of time will naturally elapse between the impulse from circuit breaker CB3 at 325° which energizes the restoring magnet 41 and the time that the tape movement contact 26 actually closes again. This is shown arbitrarily as being 10° later at 335°. The contact restoring magnet 41 is impulsed only from 325° to 350° and as soon as it is de-energized armature 37 will be permitted to return to its de-energized position with the help of spring 43 and thus shoe assembly 22 will be lowered onto the tape 1 again resting against the ear 45 and in position for the next movement of the tape.

To summarize, in normal operations, error control relay R1 is picked up early in each punch cycle thus preventing an impulse from circuit breaker CB2 from reaching error relay R2 through the R1b points. Relay R1 is dropped out late in the cycle thus preventing an impulse from circuit breaker CB3 from reaching the error relay R2 through the R1b transfer points. This process is repeated in each normal punch cycle and error relay R2 will not be picked up at any time during a normal punch cycle. Tape movement contact 26 will be closed while the tape is stationary and while punching is taking place during the first half of the punch cycle and permit relay R1 to pick but as soon as tape movement occurs, then the tape movement contact 26 will open in the last part of the cycle and thus permit the drop of relay R1. If error control relay R1 picks up and drops out properly, error relay R2 cannot be energized.

Reference is made to FIG. 6 for a discussion of the sequence of actions when the tape movement contact 26 fails to restore to its normally closed position. It is assumed in the first punch cycle shown on the sequence chart that the tape movement contact 26 had restored and was closed at the beginning of the cycle. The test for proper restoration was successfully made in this first cycle since relay R1 had been properly picked up. Tape movement occurs from 230° to 300° of the punch cycle and it can be seen that since the restoring magnet 41 receives its impulse at 325° to 350°, the contact should have been restored as shown in the normal operation at 335°, about 10° after the circuit breaker impulse was received. The tape movement contact 26 failed to close, however, due perhaps to tape being jammed under the shoe assembly 22 so that the shoe assembly 22 could not return to its normal position against the stop 45 and thus projection 34 keeps contact strap 27 away from contact strap 28. The test for proper restoration of the tape movement contact 26 is made from CB2 early in the second cycle at 75° to 100°. Since the tape movement contact 26 has remained open this prevents relay R1 from picking up early in this second cycle. Thus the impulse from circuit breaker CB2 can get through the R1b points and pick error relay R2. This is shown occurring about 10° later in the second cycle at 85°. Error relay R2 holds through its own R2a point and through a reset switch which is normally closed to the line. As soon as relay R2 is picked up the R2b points will be closed, the stop relay R3 will be energized and the error light 55 will light.

Energization of the clutch magnet described in conjunction with FIG. 1 might be directed through normally closed points of the stop relay R3. When R3 is energized as a result of the error relay R2 being picked, no impulse can reach the clutch magnet, the clutch will not be engaged and machine operations cease, awaiting corrective action.

Stop relay R3 is provided in addition to error relay R2 because even though additional normally closed points of error relay R2 can be used in the clutch magnet circuit to prevent energization of the clutch magnet when there is a tape movement error, under actual machine operations there are other conditions when R3 might be needed to stop machine operations such as depression of the stop key, or recognition of an incorrect number of holes in the tape.

FIG. 7 illustrates the sequence of actions when the tape movement contact 26 remains closed because the tape has failed to move due to breakage, or for other reasons. It can be seen that the tape movement contact 26 is closed at the beginning of the punch cycle in FIG. 6 and that the restore test is successfully completed. It can also be seen that the tape movement contact 26 does not open in the last half of the cycle as it should under normal operations and consequently relay R1 remains transferred or picked up. Because of this, the impulse from circuit breaker CB3 at 325° to 350° of the punch cycle can reach error relay R2 through the R1b normally open points. Error relay R2 is shown as fully picked up 10° later at 335°. Relay R2 being picked up causes the stop relay R3 to be energized and the error light to light through the relay R2b normally open points and through the reset switch normally closed to line. The error relay R2, the error light, and the stop relay R3 are all held through the normally closed reset switch to line. As soon as the trouble causing the error relay to pick up has been corrected, these three components can be dropped out by opening the normally closed reset switch. Since relay R2 and the stop relay R3 are energized fully at 335° of the punch cycle, the clutch magnet is prevented from energizing and the machine stops at the end of the same cycle in which the failure has occurred.

After a failure of the kind last described, relay R1 pick and dropout coils will be energized through R1a so long as the tape movement contact 26 remains closed. Therefore, in this particular circuit it will be desirable to open the tape movement contact 26 to dropout relay R1. This could be accomplished directly by hand, or by locating the reset switch near the tape movement contact 26 and having a projection on the reset switch which moves as the reset switch is operated and will mechanically force the tape movement contact 26 open.

While there have been shown and described and pointed out the fundamental novel features of the invention as applied to the preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In combination with a web handling device including means to feed a web intermittently along a prescribed path, cyclically operating web movement detection means comprising a contact device, contact operating means comprising an element initially in a position to rest on the web so that it is moved to an actuated position by movement of the web thereby changing the condition of said contact device, restoring means for restoring said contact operating means to its initial position, and means comprising a circuit including said contact device and responsive to the condition thereof for indicating movement or non-movement of the web.

2. In combination with a web handling device including means to feed a web intermittently along a prescribed path, cyclically operating web movement detection means comprising a contact device, contact operating means comprising an element initially in a position to rest on the web, so that it is moved to an actuated position by movement of the web thereby changing the condition of said contact device, restoring means for restoring said contact operating means to its initial position, a circuit including said contact device and a current responsive means, said circuit providing electrical impulses in conjunction with said contact device and said current responsive means for testing the restoration of said contact operating means to its initial position before each movement of the web, and for testing that the condition of the said contact device has been changed by movement of the web, and error indicating means controlled by said current responsive means for indicating a failure of said contact operating means to restore and for indicating a failure of said contact device to change condition.

3. A device for detecting movement or non-movement of a web comprising in combination a contact device, contact operating means comprising an element initially in a position to rest against the web and responsive to the movement thereof so as to affect the condition of said contact device, means for providing timed electrical impulses, electrical restoring means selectively energized by one of said impulses, said electrical restoring means including a magnet and an armature to which said element is attached so that when said magnet is energized said element is moved away from the web, means tending to move said element to its initial position when said magnet is de-energized, a circuit including said contact device and current responsive means, and error indicating means controlled by said current responsive means and by said impulses for indicating movement or non-movement of the web and for indicating the restoration of said element to its initial position.

4. A web movement detection device, comprising a web intermittently operable web moving means, a pair of electrical contacts, frictional means initially positioned against said web and operated by said web during each movement thereof for actuating said contacts, means for moving said frictional means away from said web and for restoring said frictional means to its initial position, means under control of said web moving means for producing a first and a second test pulse for each operation of said web moving means, circuit means including said contacts, said circuit means being operated under control of said first test pulse for indicating a failure of said web to move, and said circuit means being operated under control of said second test pulse for indicating a failure of said frictional means to be restored to its initial position.

5. In combination with a web handling device including means to feed a web intermittently along a prescribed path, cyclically operating web movement detection means, comprising a contact device, contact operating means comprising an element initially in frictional engagement with the web so that movement of the web will cause said element to change the condition of said contact device, means for disengaging said element from the web and for restoring the said element to its initial position, and means comprising a circuit including said contact device and responsive to the condition thereof for indicating movement or non-movement of the web and for indicating proper restoration of said element.

6. In combination with a web handling device including means to feed a web intermittently along a prescribed path, cyclically operating web movement detection means comprising a contact device, contact operating means comprising an element initially in a position to rest on the web, so that movement of the web will cause said element to change the condition of said contact device, means for moving said element away from said web and for restoring it to its initial position, a circuit including said contact device and a current responsive means, said circuit providing electrical impulses in conjunction with said contact device and said current responsive means for testing the restoration of the said element to its initial position before each movement of the web, and for testing that the condition of said contact device has been changed by actuation of said element in response to movement of the web, and error indicating means controlled by said curent responsive means for indicating a failure of said element to restore and for indicating a failure of said contact device to change condition.

References Cited in the file of this patent

UNITED STATES PATENTS

| | | |
|---|---|---|
| 2,142,880 | Anderson et al. | Jan. 3, 1939 |
| 2,410,521 | Potts | Nov. 5, 1946 |
| 2,418,464 | Corwin | Apr. 8, 1947 |
| 2,546,819 | Gooderham | Mar. 27, 1951 |
| 2,547,525 | Hague | Apr. 3, 1951 |
| 2,554,549 | Albert | May 29, 1951 |
| 2,728,905 | Eklund | Dec. 27, 1955 |
| 2,775,753 | Kennedy | Dec. 25, 1956 |